No. 754,509. PATENTED MAR. 15, 1904.
J. C. SNIDER.
COMBINED PIPE AND NUT WRENCH.
APPLICATION FILED JULY 31, 1903.
NO MODEL.
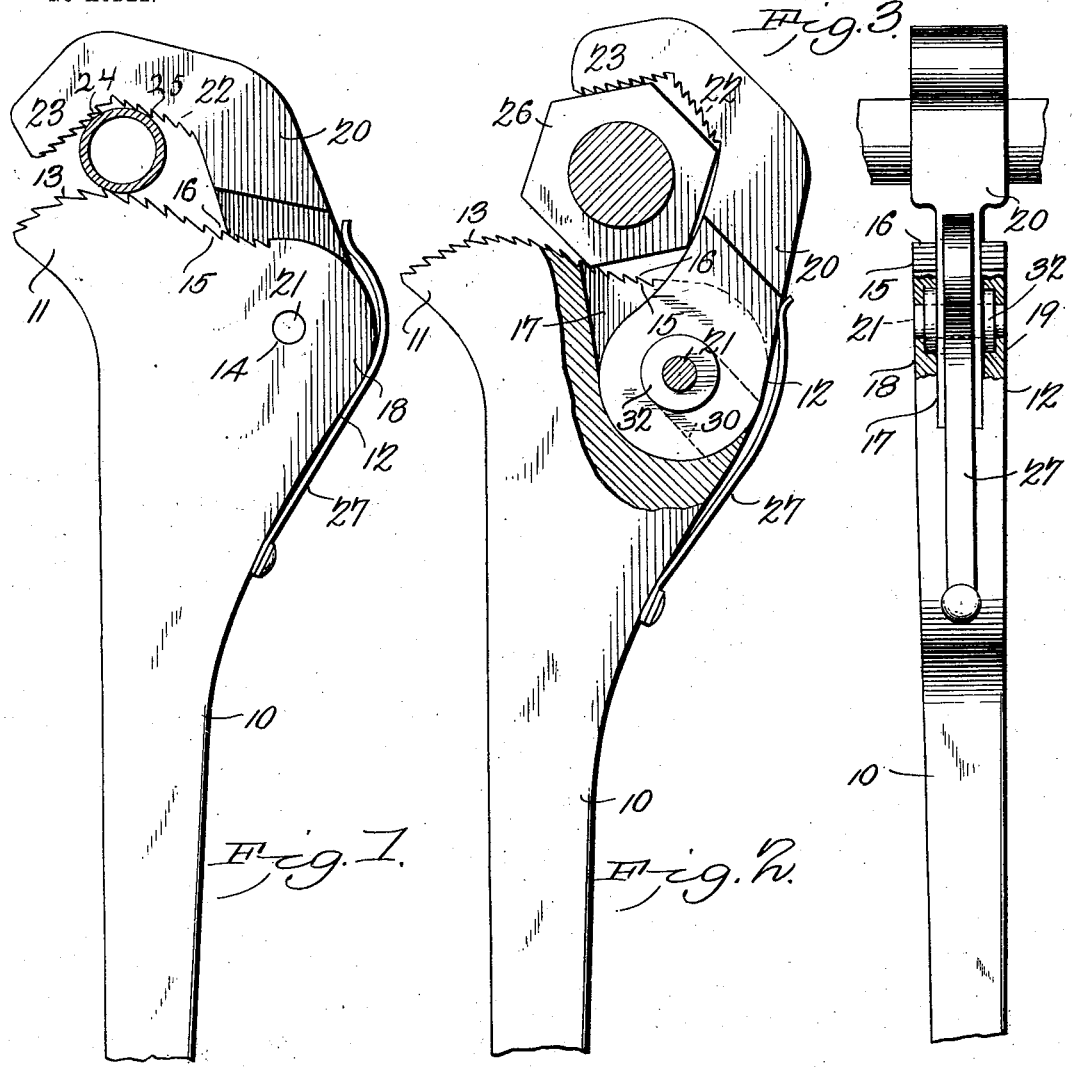
Witnesses
J. C. Snider, Inventor.
by C. A. Snow & Co.
Attorneys No. 754,509. Patented March 15, 1904.

UNITED STATES PATENT OFFICE.

JOHN CHARLES SNIDER, OF CRIPPLECREEK, COLORADO.

COMBINED PIPE AND NUT WRENCH.

SPECIFICATION forming part of Letters Patent No. 754,509, dated March 15, 1904.

Application filed July 31, 1903. Serial No. 167,781. (No model.)

*To all whom it may concern:*

Be it known that I, JOHN CHARLES SNIDER, a citizen of the United States, residing at Cripplecreek, in the county of Teller and State of Colorado, have invented a new and useful Combined Pipe and Nut Wrench, of which the following is a specification.

This invention relates to wrenches adapted for turning circular bodies, such as pipes or rods, or irregular bodies, such as nuts.

The object of the invention is to produce a simple implement which may be easily applied and operated and which may be employed without change in structure or in the means of operation for gripping and turning with equal facility circular or non-circular bodies which are not too large to be gripped by the wrench.

The invention consists in certain novel features of construction, as hereinafter shown and described, and specified in the claim.

In the drawings illustrative of the invention, in which corresponding parts are denoted by like designating characters, Figure 1 is a side elevation of the implement applied to a relatively small circular body; and Fig. 2 is a similar view, partly in section, showing the implement applied to a relatively large nut to illustrate its range of utility. Fig. 3 is a rear elevation of the wrench applied to a pipe or rod.

The improved implement consists of a stock portion 10, extended into a handle at one end and formed with lateral extensions 11 12 at the other end, the extension 11 being convex upon its outer end and formed with transverse serrations 13 and the extension 12 provided with a transverse aperture 14, disposed outside the longitudinal plane of the stock, as shown.

The end of the stock 10 between the projections 11 12 is concaved, as at 15, and provided with transverse serrations 16, merged into the serrations 13 of the extension 11, as shown.

The extension 12 is provided with a central cavity 17, forming spaced wings 18 19, through which the aperture 14 passes and in which a grip member 20 is movably secured by a pivot-pin 21 engaging the aperture 14, as shown.

The outer end of the grip member 20 is extended in reversed angles 22 23 and with serrations 24 25, respectively, in the angular portions, as shown.

The angular portions, as shown in Fig. 2, serve an important purpose when the implement is employed in turning nuts, one of which is represented at 26, as they coact with the concave portion 15 and firmly grasp the nut and effectually prevent it from slipping, no matter how severe the strains may be or what size the nut may be.

The peculiar form of the hook members 20 22 23 insures its firmly gripping any-shaped object over which it may be placed with equal facility, no matter what shape or size.

The concave portion 15 is a very important feature in this connection, as it forms a "pocket" into which one side of the nut rests and effectually prevents any tendency of the implement to slip therefrom.

A spring 27 is attached to the stock 10 and bearing upon the outer side of the grip member and holding it yieldably in operative position and insuring the proper position for action; but it will be understood that the spring does not effect any gripping action and is only strong enough to prevent the grip member from falling to the rear by gravity when released. The spring materially increases the convenience of the implement by holding the grip member constantly in operative position.

The parts will preferably be of steel properly hardened at the grip-points and will be constructed in graduated sizes, as required.

The handle portion may be of any required length and constructed of any required material or combinations of materials.

In order to strengthen the connection between the fixed and movable jaws, the fixed jaw has a pair of slots 30, extending in a radial line from the center of pin 21, and the movable jaw is provided with circular lugs 32, fitted within said slots. This materially strengthens the structure and lessens liability of breakage.

Having thus described the invention, what I claim is—

A wrench for circular and non-circular bodies, comprising a stock having oppositelydisposed lateral extensions at one end, one of said extensions being provided with transverse serrations and the other of said extensions being provided with a slot extending longitudinally of the stock and having oblique grooves formed in the sides of the slot, and a grip member pivotally mounted in said slot and having round lateral lugs encircling the pivot and fitting in the ends of the grooves in the sides of said slot, said grip member having its free end extended over the serrated lateral extension of the stock and having its gripping-face formed concave and provided with transverse serrations.

In testimony that I claim the foregoing as my own I have hereto affixed my signature in the presence of two witnesses.

JOHN CHARLES SNIDER.

Witnesses:
 JNO. E. RINKER,
 JAMES L. WALLACE.